United States Patent [19]

Boozer et al.

[11] Patent Number: 4,845,682

[45] Date of Patent: Jul. 4, 1989

[54] INTERFERENCE AVOIDANCE DEVICE FOR USE IN A SENSOR SYSTEM

[75] Inventors: James M. Boozer, Hampton, N.J.; Robert W. Mayer, Pleasanton, Calif.

[73] Assignee: Electro Corporation, Sarasota, Fla.

[21] Appl. No.: 89,357

[22] Filed: Aug. 24, 1987

[51] Int. Cl.$^4$ .......................... G01S 9/66; G08B 13/18
[52] U.S. Cl. ...................................... 367/93; 340/552; 342/16; 342/27
[58] Field of Search .................................. 367/93–94; 340/552, 554; 342/27, 16

[56] References Cited

U.S. PATENT DOCUMENTS

| | | | |
|---|---|---|---|
| 3,854,115 | 12/1974 | Barthelemy | 367/93 |
| 4,072,944 | 2/1978 | Bianco et al. | 342/16 |
| 4,512,000 | 4/1985 | Masuko | 367/93 |
| 4,682,153 | 7/1987 | Boozer et al. | 340/552 X |

*Primary Examiner*—Glen R. Swann, III
*Assistant Examiner*—Thomas J. Mullen, Jr.
*Attorney, Agent, or Firm*—Pennie & Edmonds

[57] ABSTRACT

The invention provides an apparatus and method to confirm or deny the presence of an object within the scan area of an ultrasonic sensing system by requiring that any object be identified on at least two consecutive scans of the sensing system and using scan energy patterns which occur at irregular repetition times to selectively reject spurious direct or reflected signals present in the area. A generator of predetermined pattern burst of ultrasonic energy is arranged to produce one such burst of ultrasonic energy and a timing signal is coupled thereto so as to apply timing signals to cause production of the bursts. The timing signal source produces timing signals only according to a varying pattern whereby separation between adjacent signals meet certain present parameters. The energy patterns are applied to a transmitter which applies them to a scan area whereby the echo or returned energy from an object in the scan area is received and stored. The return from the next sequential burst is also stored and compared to the first. If the two agree the presence of the object is confirmed. If the two do not agree, then the contents of storage one is destroyed and the storage used to store the next sequential burst is compared. Failure to confirm means that an object was not present or that the object moved out of the scan area before its presence could be confirmed or a false signal was present, or one of a number of reasons, but no object is present.

28 Claims, 4 Drawing Sheets

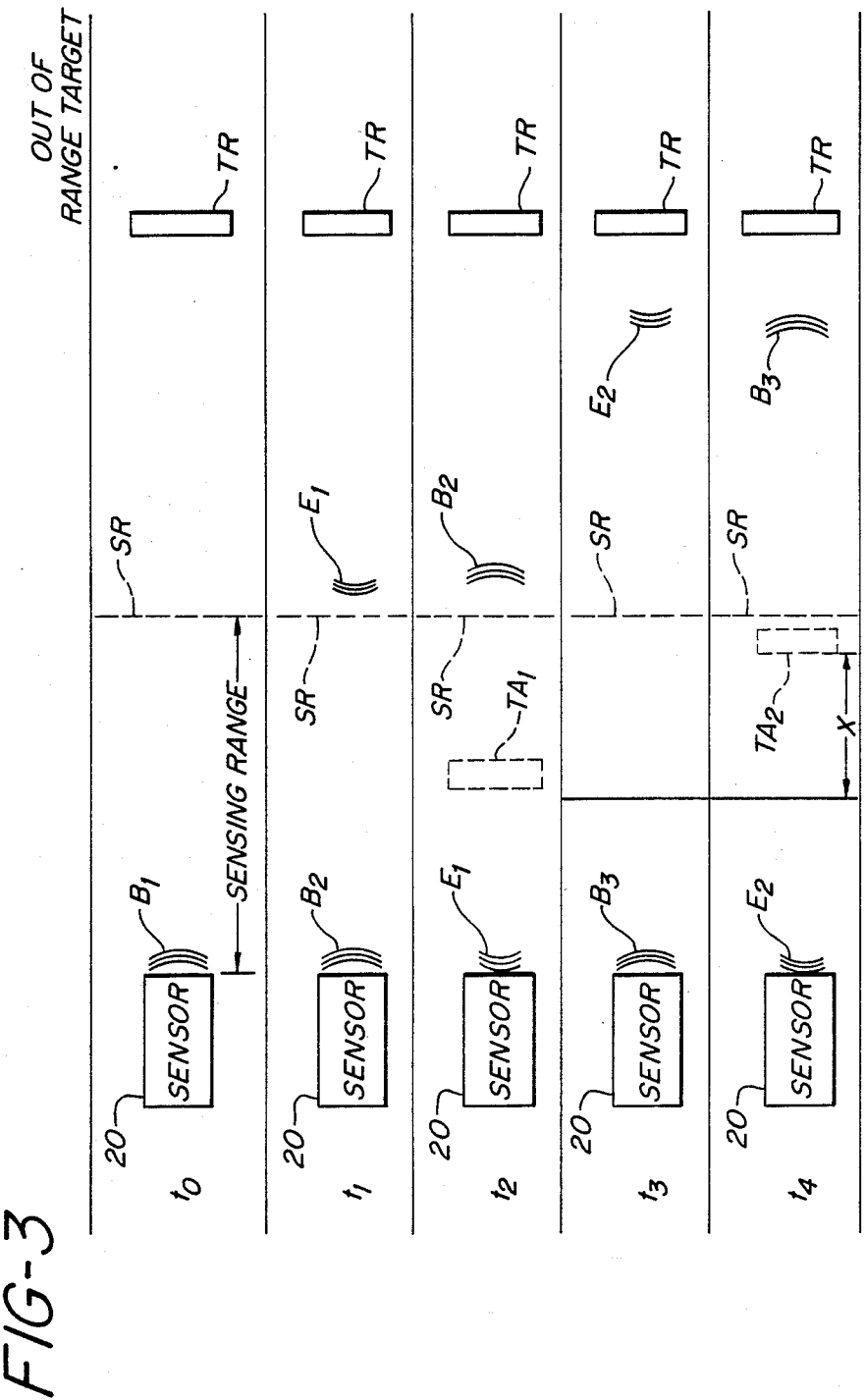

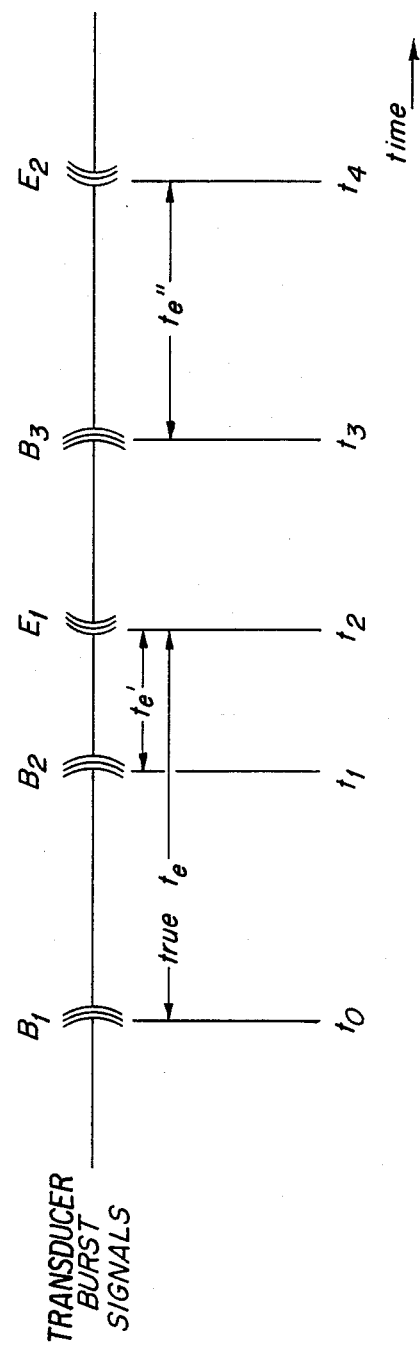

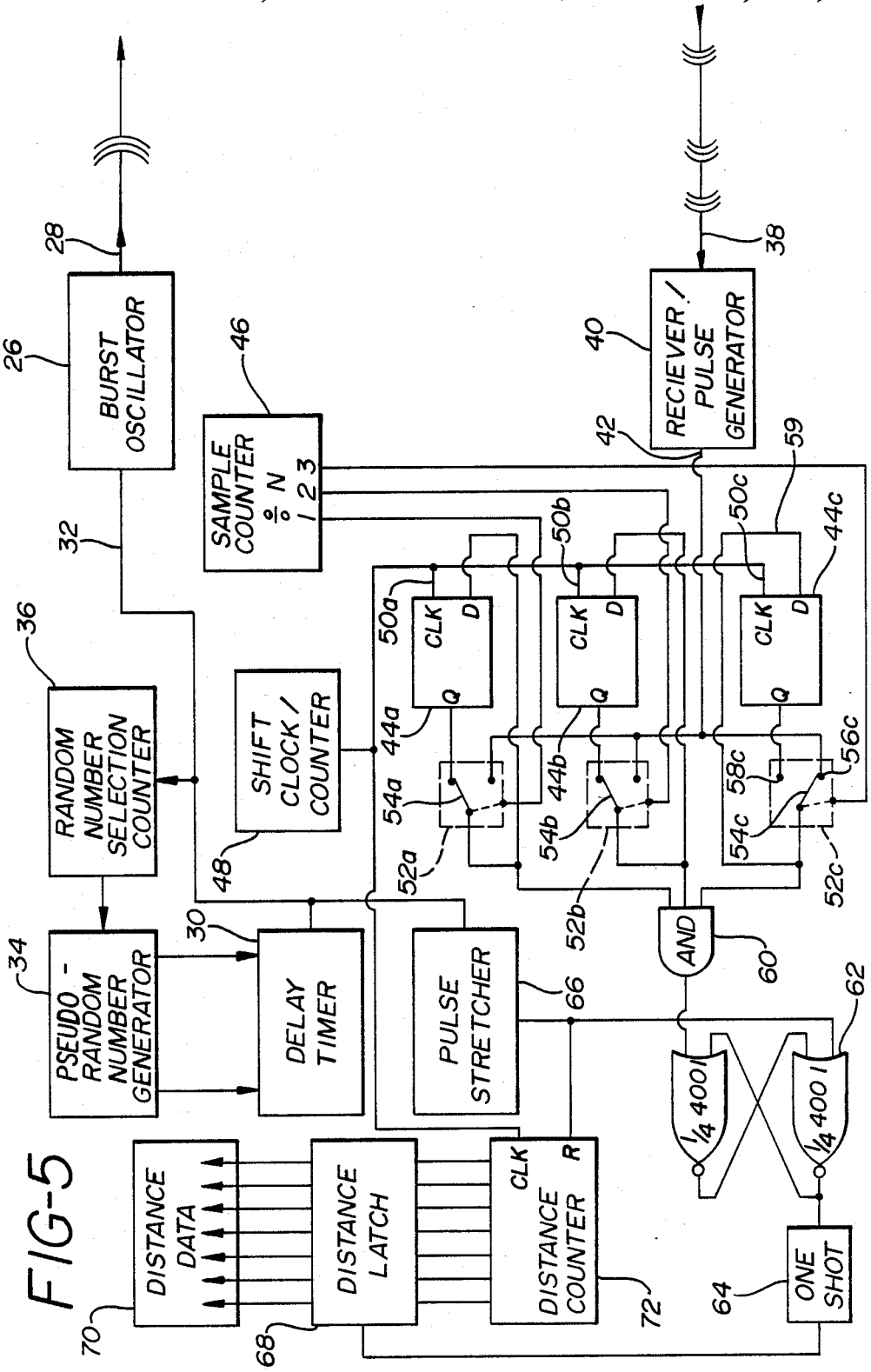

INTERFERENCE AVOIDANCE DEVICE FOR USE IN A SENSOR SYSTEM

BACKGROUND OF THE INVENTION

1. Field of the Invention

The invention applies to sensor systems where the presence or absence of an object within the scan area must be established and more particularly where the presence or absence of an object within the scan area must be determined where many objects are present and many other movable sources of scan energy are also present in the general area leading to the production of spurious signals which interfere with the operation of the sensor system.

2. Description of the Prior Art

With the modern trend away from fixed assembly lines where objects in process are moved from one work station to another fixedly arranged along an inflexible conveyor line to flexible assembly, the work stations are now placed on the factory floor, as desired, and the objects in process are moved randomly from work station to work station depending upon the product being manufactured. The flexible path object which replaces the fixed conveyor line or belt is often the automatic guided vehicle or AGV. The AGV is free to move along the factory floor and present its object in process to each work station according to its control program which program can be changed at will each time production is shifted to a new product. Since the travel paths of the AGVs may cross one another, it is essential that the AGVs do not collide with each other or with another object or person. A commonly-employed technique is to operate the AGV at some prescribed speed and in the presence of an object to slow the AGV to creep speed and sound an audible warning signal and finally to stop if the AGV's bumper engages a solid object.

A common sensor system employed with AGVs to locate objects in their paths is the ultrasonic sensor system which transmits a burst of ultrasonic energy along a path in front of it and receives the return signal from any object in its path. If a single AGV is operating along a prescribed path and the transmitted energy is narrowly contained, the absence of any return or the absence of a return within a prescribed time period indicates that there is no object in the path of the AGV and it may advance at its regular speed. If a return within the prescribed time period occurs the AGV slows to creep speed until an object is encountered.

The presence of two or more AGVs operating in a confined area complicates the functioning of the sensor system. Two AGVs each having a sensor system operating at the same frequency of ultrasonic transmission can read each other's transmissions and misinterpret them as returns from an object in their path. Ghost returns, which are returns from objects beyond the normal scan area of the sensor system but which return in a proper time orientation with respect to any transmitted energy burst can be read as objects in the AGV's path, etc. In response to all of these false or spurious returns, the AGVs slow to creep speed and sound their alarms and continue to do so until no return is received.

Proposals have been made to reduce or eliminate this interference between AGVs working in confined areas using ultrasonic sensor systems but each have their drawbacks and limitations and usually result in severely limiting the number of AGVs which can operate at one time. One solution is to operate each sensor at a different frequency. While this might be practical with just a few sensors in a given location, it becomes very difficult to manage if many sensors are involved due to the limited range of operating frequency of most practical transducers and the minimum practical bandwidth of the receiver used with each sensor. Another is to assign different amplitudes to the transmitters of each sensor system but this is not practical since the received echo or return signal amplitude bears no traceable resemblance to the burst amplitude transmitted. Accordingly, modulation of burst amplitude to produce a burst signature to identify a particular transmitter is not practical either.

The use of the burst duration to identify a particular transmitter and thus a sensor system is not useful since the duration of the echo can be altered by the type or quality of the target struck. For example, the echo duration would be longer if it were to strike a set of stairs than a flat wall, although both objects were essentially at the same distance from the transmitter.

SUMMARY OF THE INVENTION

The present invention overcomes the difficulties encountered in the prior art and permits the use of a large number of AGVs, each with their own sensor system, by eliminating the phantom targets and ghosts present in conventional systems. The interference avoidance system of the present invention makes use of the randomization of the sensor burst repetitive rate and employs multiple sampling criteria to note the apparent position of targets on successive sensing bursts and finally the application of information processing techniques to evaluate the validity of targets appearing within the sensing field.

A generator capable of producing a predetermined pattern of ultrasonic energy at a given repetition rate is coupled to a transmitter/antenna arrangement for applying the energy to a prescribed search area. A control unit is coupled to the generator to vary the repetition rate of the generator and thus vary the time between transmission of each energy burst. The control unit contains a source of random signals and a selection network to insure that consecutive control signals vary by at least a prescribed minimum. Thus, two consecutive control signals cannot have the same repetition rate and the energy bursts similarly cannot have the same repetition rate. The first echo or return signals from targets or objects in the search area are applied to a first storage means and the next sequential echo or return signals are applied to a second storage means and the two stored signal patterns are compared. If both signal patterns agree, then there is a target or object in the search area and the AGV must go to creep speed to prevent injury to the AGV or the object in its path. If the two stored signal patterns do not agree, then the first stored pattern is erased and the third sequential echo signal pattern is stored in the first storage means. Again the contents of the two storage means are compared and action taken as above. The echo signal patterns can also be fed to a data processor for analysis. For example, it can be determined by comparison of the return signal pattern that for such patterns to occur, the object would have to be moving into the search area in which case the AGV would have to be alerted to be ready to go to creep mode or conversely that the object is moving out of the range of the sensor system and that it need not worry about such object. It is therefore an object of this invention to provide a novel interference avoidance device for use in a sensor system.

It is an object of this invention to provide a novel interference avoidance device for use in a sensor system by use of the randomization of the sensor burst repetition rate.

It is another object of this invention to provide a novel interference avoidance device for use in a sensor system by use of the randomization of the sensor burst repetition rate and multiple sampling criteria to note the apparent positions of targets on successive sensing bursts.

It is another object of this invention to provide a novel interference avoidance device for use in a sensor system by use of the randomization of the sensor burst repetition rate and multiple sampling criteria to note the apparent positions of targets on successive sensing bursts and the application of information-processing techniques to evaluate the validity of targets appearing within the sensing field.

Other objects and features of the invention will be pointed out in the following descriptions and claims and illustrated in the accompanying drawings which disclose, by way of example, the principles of the invention, and the best mode which has been contemplated for carrying it out.

BRIEF DESCRIPTION OF THE DRAWING

In the drawings in which similar elements are given similar reference characters:

FIG. 3 is a schematic diagram illustrating the interference avoidance technique of the instant invention.

FIG. 4 is a timing diagram further illustrating the operation of the interference avoidance technique of the instant invention.

FIG. 5 is a block diagram of a system constructed in accordance with the concepts of the invention.

DESCRIPTION OF THE PREFERRED EMBODIMENT

Figure 1:
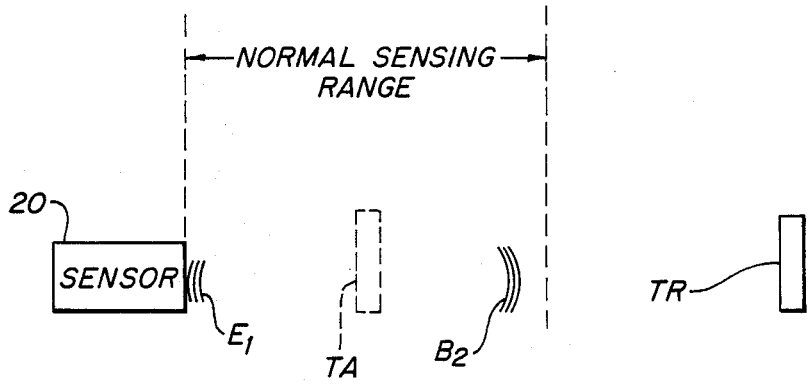
FIG. 1 is a schematic representation of burst signals, echoes and targets which are found in the fixed repetition rate ultrasonic sensor systems of the prior art.

A large family of distance measuring and presence sensing systems operate on the principle of measuring the elapsed time between the emission of a burst of energy from a transmitter and the receipt of the resultant echo returned from an object within the sensing area. This elapsed time, in conjunction with the velocity of propagation of the burst of energy in the particular operating medium, can be used to measure the distance between the transmitter/receiver and the object or target. Common systems of this type are sonar and radar. Such sensing systems are, however, subject to the detection of "phantom" targets or "ghosts." "Phantom" targets and "ghosts" are objects that appear to exist within the sensing area, but in reality, do not exist. They result when the receiver or sensor receives energy from a source unrelated to the current or last-transmitted energy burst. For example, phantom targets or a ghost can be produced by the system itself as when echoes from a previous burst are received when the system is listening for echoes from the current or last burst. In FIG. 1, sensor 20 is receiving echo $E_1$, which when viewed in relation to the time of transmission of burst $B_2$ appears as target $T_A$ within the normal sensing range, while in actuality there is no target within such range, and real target $T_R$ is outside of such range. Any AGV associated with such a sensor system would needlessly go to its creep mode. One solution to the problem is to make the interval between bursts arbitrarily long, to allow all previous reflections to disappear. This, however, is at the sacrifice of system response time.

Figure 2:
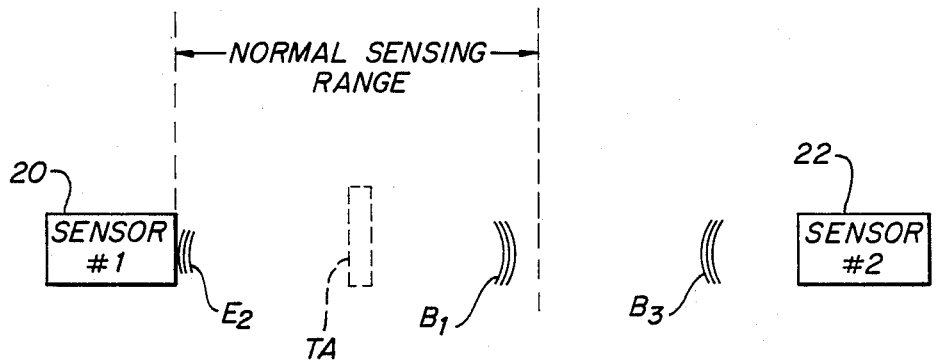
FIG. 2 is a schematic representation of the burst signals and targets which are found when two fixed repetition rate ultrasonic sensor systems of the prior art are operating in the same sensing area.

In a similar manner, phantom targets or ghosts can be produced by another similar sensing system operating in the area of the first sensor system. FIG. 2 shows such a situation. Sensor system 20 emits burst $B_1$ and, while waiting for the resultant echo, receives burst $B_2$ emitted by sensor system 22. Based on the elapsed time from the transmission of burst $B_1$ and the receipt of burst $B_2$, sensor system 20 determines there is an object or target $T_A$ in its normal sensing range and again goes to its creep mode while there is no target in such range. This situation may be particularly troublesome because of the strength of the signal being a primary or direct burst from the interfering sensor system 22 undiminished by reflection.

It is common in some sensing systems, particularly in ultrasonic sensors, to employ a multiple-sample criterion to add stability to system performance. This multiple-sample criterion is imposed by verifying that the target is present for at least two successive sensing bursts before responding to the target presence and, in the same manner, verifying that the target is absent for at least two consecutive sensing bursts before responding to target absence. Although the multiple sample technique provides better stability in the presence of marginal return echoes, it does not of itself provide any immunity to phantom targets or ghosts because, in systems with fixed burst repetition rates, the phantom target or ghost continues to appear at the same position on successive bursts due to the synchronous nature of the interference.

The present invention provides a technique and equipment by which the sensor system can reject the appearance of phantom targets and ghosts. The system relies on the interaction of three elements:

1. randomization of the sensor burst repetition rate.
2. use of multiple-sample criteria to note the apparent position of targets on successive sensing bursts.
3. the application of information-processing techniques to evaluate the validity of targets appearing within the sensing field.

The foregoing system is shown diagrammatically in FIGS. 3 and 4 which, respectively, show the positions of the burst signals B, the echoes E and the targets real $T_R$ and apparent $T_A$ for a sensor system 20 according to the invention in FIG. 3 and the timing of the burst signals B and echo signals E in FIG. 4. At time $t_o$, a first burst $B_1$ is transmitted and as shown, the only potential or actual target $T_R$ is outside of the sensing range of sensor system 20 indicated by the dashed line SR. At the same time as the first burst $B_1$ is transmitted, an interval timer (not shown) is started. This timer is permitted to count up to an amount equal to the maximum elapsed time required by a burst to reach the most distant target the system can handle and return to the sensor. Each successive burst resets the timer to zero and begins its count. Thus, at time $t_1$, sensor system 20 transmits burst $B_2$ and resets the timer to zero so that echo $E_1$ from target $T_R$, outside of the sensing range of sensor system 20, will not be registered by the system 20. Period true $t_e$.

At time $t_2$, echo $E_1$ reaches sensor system 20 and is interpreted in light of the time of transmission of burst $B_2$ when the elapsed timer started to run again. The time period $t_{e'}$ thus identifies a phantom target at the position of $T_{A1}$ in the sensing range SR. At time $t_3$, a new burst $B_3$ is emitted and an echo $E_2$, the result of burst $B_2$ striking out of range target $T_R$, is making its return trip towards sensor system 20. The echo $E_2$ arrives at sensor system 20 during time $t_4$ while burst $B_3$ is still on its way to the out-of-range target $T_R$. As a result of the elapsed time $t_e''$ from the transmission of burst $B_3$, the echo $E_2$ is interpreted as the apparent target $T_{A2}$. However, because of the shifted time-base reference, the period between bursts 2 and 3 is longer than the period between bursts 1 and 2, and phantom or apparent target $T_{A2}$ is shifted with respect to phantom or apparent target $T_{A1}$ and thus appears at a different location with respect to sensor system 20. This offset distance is represented by the reference character x.

The information-processing techniques are now employed to evaluate what the received echoes mean. Since the apparent targets $T_{A1}$ and $T_{A2}$ did not appear in the same position on two successive bursts (two sample criteria), there is no confirmation of the presence of an object. Allowance can be made for reasonable target movement during the sensing intervals by modifying the evaluation criteria. Objects that appear to be moving at speeds beyond that expected of objects in the search area can also be disregarded. By selecting the proper evaluation basis, one can also determine if an object is moving into or out of the search area and at what speed to perhaps alert the sensor system to possible future dangers. These same techniques will also reject signals from other sensors of the same type, since the principle serves to reject any echoes not in synchronism with the time base of the individual sensor. The probability of synchronism is virtually non-existent due to the randomized burst repetition rate of each individual sensor. This probability of occasional phantom target appearance can be readily assessed using statistical techniques.

Turning now to FIG. 5, there is shown a block diagram of a sensor system 24 constructed in accordance with the concepts of the instant invention. Burst oscillator 26 is arranged to produce a burst of ultrasonic energy on output line 28 coupled to a suitable transmitter and antenna combination not shown, but well known in the art. Each burst will have a predetermined pattern that is a uniform amplitude and fixed duration. One such burst oscillator is the Polaroid Corporation Model 301 Sonar Transceiver. The repetition rate of the predetermined burst patterns produced by burst oscillator 26 is normally constant but may be varied by the application of signals from delay timer 30 on input line 32. The signals from delay timer 30 can cause the repetition rate to vary to either side of the base repetition rate, that is the period can be shortened or lengthened. The signals applied to burst oscillator 26 are determined by pseudo-random number generator 34 and random number selector counter 36 in the form of a matrix which may be a type of white noise generator as is well known in the art. Random number selector counter 36 examines the numbers generated to insure that any two consecutive numbers applied to the delay timer have a minimum of $\Delta$ separation between them. Any numbers not meeting this criteria are not permitted to be applied to delay time 30 by the pseudo-random generator 34. For example, minimum time between two consecutive bursts would be that amount of time required to travel to the furthermost target in the scan area and return to sensor system 24. The upper limit for the time between adjacent bursts is prescribed by the system response time and the longest time the user can afford to wait for the response. Additionally, one cannot wait so long that the object moves enough to invalidate the echo pattern comparison.

The organization of burst oscillator 26, delay timer 30, pseudo-random number generator 34 and random number selection counter 36 can be replaced by a stored number table which stores numbers meeting the pre-established criteria and which applies those numbers to operate burst oscillator 26 in response thereto. Alternatively, the numbers could be calculated by a computer using an appropriate algorithm again satisfying the pre-established criteria.

As stated above, each burst is placed on output line 28 to the transmitter/antenna unit which transmits the signals into the scan area. Any reflections or echoes from objects in the scan area or beyond or signals from other sensor systems working in the area are received by a receive antenna (not shown) and feed over input line 38 to receiver-pulse generator 40 such as a Texas Instruments type TL852 Sonar Ranging Receiver which produces a pulse for each group of signals that makes up the complete echo. Thus, for a particular object, based on size, shape, regularity, material, etc., a particular pattern of reflected signals may be received. For example, for a flat wall, one reflection may occur but for a series of six steps, six discrete reflections may occur. But the same reflection pattern will be produced each time it is struck with a burst of ultrasonic energy. Each packet of reflection or echo energy in a clock segment of time results in the production of a pulse representing a one and the absence of echo energy results in the production of no pulse or a pulse representing a zero. The output of receiver-pulse generator 40 is fed over line 42 to one of a number of shift registers 44. The number of shift registers 44 available is dependent upon the sample criteria chosen. Up to this point, the discussion has been based upon two sample criteria meaning that the same return pattern must appear twice in succession. Here, three shift registers 44 are employed to give three sample criteria and a better reliability than the two-sample approach. Sample counter 46 in response to signals from delay timer 30 to burst oscillator 26 operates the shift registers 44a, 44b and 44c in order so that the first return pattern enters shift register 44a, the second 44b and the third 44c.

The shift registers 44 are flip-flop counters, as is well known in the art, or may be a storage register of a computer, each having sufficient stages to store in serial order the number of pulses used to describe the echo or return signal from receiver-pulse generator 40. Shift clock counter 48 coupled to the clock inputs 50 of the shift registers 44 step the registers 44 to admit pulses on line 42 and also to recirculate the contents of the registers 44. Data selectors 52 control the entry of pulses from line 42, the recirculation of the register 44 contents and the output of register 44 to the comparator or AND gate 60. Data selector 52 is effectively a switch whose blade 54 can be moved between an entry position 56 and a recirculate/output position 58 under the control of a signal from sample counter 46. Data selector 52c is set in the input state with blade 54c connected to terminal 56c so that pulses applied via line 42 to terminal 56c are passed along blade 54c, input-recirculation line 59c to input D of shift register 44c and stepped along by pulses from shift clock counter 48 until the entire field echo pattern is recorded, at which time sample counter 46 operates data selector 52c to position blade 54c in contact with terminal 58c to receive the output from terminal Q of shift register 44c.

With blade 54c moved to terminal 58c, all three shift registers 44a, 44b and 44c are all set to apply their contents to inputs of the comparator or AND gate 60 as well as to recirculate their contents over line 59 to their respective input terminals D. Alternatively, the contents of registers 44a and 44b could apply their stored contents to AND gate 60 while blade 54c still contacts terminal 56c so that the incoming pulses on line 42 are applied to the third input to AND gate 60 and to the recirculation path for entry at terminal D into register 44c. In this way comparison can be made while register 44c is being loaded and no time need be wasted loading the register first. An AND gate is one that produces an output only if all inputs are present. Thus, if the three samples agree exactly AND gate 60 will put out a series of pulses to flip-flop counter 62 which applies a pulse to one-shot multi-vibrator 64 upon receipt of a pulse from pulse stretcher 66. Pulse stretcher 66 takes the output of delay timer 30 and after a period of time provides an output pulse to test flip-flop counter 62. If the flip-flop 62 has been set properly by the AND gate 60 the one-shot multi-vibrator 64 will be operated to provide a single pulse to the input terminal LE of distance latch 68 which provides its output in parallel to distance data display 70 to show the distance between the sensor system 24 and a verified target. The distance information is provided by distance counter 72 which receives at input terminal CLK the clock signals of the shift clock counter 48 via line 74. The distance count is transferred in parallel to distance latch 68 which stores it until it is released to distance data display 70 in response to the output pulse of one-shot multi-vibrator 64.

At the end of the maximum period selected for completion of the sampling, pulse stretcher 66 applies a signal to the reset terminal of the distance counter and clears flip-flop counter 62 indicating that no object is present in the scan area. Also the sample counter 46 operates shift register 44a to admit the next set of echo response pulses from line 42 and accordingly deletes the past contents and on the next circulation of the registers 44a, 44b and 44c, the previous contents of shift registers 44b and 44c are compared to the new contents of register 44a. This continues until the three registers agree and an object presence is verified.

An alternative approach that could be employed would be to use the regular fixed repetition rate burst approach until an echo is received indicating a target in the sensing area and then issue immediately a check burst. The check burst will then obviously occur with a period shorter than the normal repetition rate and false target rejection is accomplished in much the same manner as with the randomized bursts.

While there have been shown and described and pointed out the fundamental novel features of the invention as applied to the preferred embodiment, it will be understood that various omissions and substitutions and changes of the form and details of the device illustrated and in its operation may be made by those skilled in the art, without departing from the spirit of the invention.

The embodiments of the invention in which an exclusive property or privilege is claimed are defined as follows:

1. An interference avoidance device for use in a sensor system comprising:
    generator means to selectively generate a predetermined pattern of signals;
    first control means for producing first control signals coupled to said generator means to produce one of said predetermined patterns of signals for each first control signal;
    timing means for producing timing signals coupled to said control means to cause said control means to produce a first control signal for each timing signal received;
    said timing means producing said timing signals at irregular intervals to cause said predetermined pattern of signals to occur at irregular intervals;
    transmitter means coupled to said generator means for transmitting said predetermined pattern of signals toward a remote point;
    receiver means to receive any reflected signals which result from the contact of said transmitted signals with a remote object;
    at least two storage means, a first storage means coupled to said receiver means to store a first reflected signal pattern; second storage means coupled to said receiver means to store the next sequential reflected signal pattern; and
    comparison means coupled to said first and said second storage means to produce a first output signal if the contents of said first and said second storage means are the same and a second output signal if the contents of said first and said second storage means are different.

2. An interference avoidance device as defined in claim 1, further comprising:
    second control means coupled to said comparison means and said first and second storage means;
    said second control means applying reset signals to clear said first and second storage means upon receipt of said first output signal from said comparison means;
    said second control means applying a reset signal to said first storage means to clear same upon receipt of said second output signal from said comparison means whereby said first storage means stores the second next sequential reflected signal pattern and said comparison means compares the second next sequential reflected signal pattern stored in said first storage means with the next sequential reflected signal pattern stored in said second storage means said sequential comparison, clearing, storage and comparison occurring until said comparison means produces said first output signal.

3. An interference avoidance device as defined in claim 2, further comprising first display means coupled to said second control means and responsive to reset signals applied to both said first and said second storage means to signal the presence of an object within the zone monitored by said sensor system.

4. An interference avoidance device as defined in claim 1, wherein there are three storage means; first storage means coupled to said receiver means to store a first reflected signal pattern $R_1$ and sequentially reflected signal patterns $R_1+3n$ where $n=1, 2, 3$, etc.; second storage means coupled to said receiver means to store a second sequential reflected signal pattern $R_2$ and sequentially reflected signal patterns $R_2+3n$ where $n=1, 2, 3$, etc.; and third storage means coupled to said receiver means to store a third sequential reflected signal pattern $R_3$ and sequentially reflected signal patterns $R_3+3n$ where $n=1, 2, 3$, etc., and said comparison means is coupled to each of said first, second and third storage means to produce a first output signal if the contents of said first, second and third storage means are the same and a second output signal of the contents of said first, second and third storage means are different.

5. An interference avoidance device as defined in claim 4, further comprising:
second control means coupled to said comparison means and said first, second and third storage means; said second control means applying reset signals to clear said first, second and third storage means upon receipt of said first output signal from said comparison means; said second control means applying a reset signal to said first storage means to clear same upon receipt of said second output signal from said comparison means, and said first storage means stores reflected signal pattern $R_4$ and said comparison means compares reflected signal patterns $R_2$ stored in said second storage means and $R_3$ stored in said third storage means; said sequential comparison, clearing, storage and comparison occurring until said comparison means produces said first output signal.

6. An interference avoidance device as defined in claim 5, further comprising first display means coupled to said second control means and responsive to reset signals applied to said first, second and third storage means to signal the presence of an object within the zone monitored by said sensor system.

7. An interference avoidance device as defined in claim 4, wherein said first, second and third storage means are each recirculating shift registers.

8. An interference avoidance device as defined in claim 4, wherein said transmitter means is a burst oscillator for producing bursts of ultrasonic energy.

9. An interference avoidance device as defined in claim 4, wherein said comparison means is an AND gate having three input terminals, one input terminal coupled to said first storage means, a second input terminal coupled to said second storage means and said third input terminal coupled to said third storage means.

10. An interference avoidance device as defined in claim 4, wherein said timing means comprises a source of random numbers.

11. An interference avoidance device as defined in claim 10, wherein said timing means further comprises selection means for selecting certain of said random numbers to be applied to said first control means.

12. An interference avoidance device as defined in claim 10, wherein said source of random numbers is a white noise generator.

13. An interference avoidance device as defined in claim 10, wherein said source of random numbers is a stored number table.

14. An interference avoidance device as defined in claim 10, wherein said source of random numbers is a calculating device programmed according to a predetermined algorithm.

15. An interference avoidance device as defined in claim 10, wherein said timing means further comprises selection means for selecting only numbers which have a separation of $\Delta$ therebetween where $\Delta$ is equal to a value between the minimum amount of time required for a burst of ultrasonic energy to travel from said transmitter to the most remote object to be detected and return to said receiver and the maximum time that the system can wait before reacting.

16. An interference avoidance device as defined in claim 4, further comprising counter means coupled to said generator means for counting the number of predetermined patterns of signals produced by said generator means.

17. An interference avoidance device as defined in claim 16, further comprising second display means coupled to said counter means to display the distance from said transmitter means to said object within the zone monitored by said sensor system.

18. An interference avoidance device as defined in claim 1, wherein said first and said second storage means are each recirculating shift registers.

19. An interference avoidance device as defined in claim 1, wherein said transmitter means is a burst oscillator for producing bursts of ultrasonic energy.

20. An interference avoidance device as defined in claim 1, wherein said comparison means is an AND gate having at least two input terminals, one input terminal coupled to said first storage means and a second input terminal coupled to said second storage means.

21. An interference avoidance device as defined in claim 1, wherein said timing means comprises a source of random numbers.

22. An interference avoidance device as defined in claim 21, wherein said timing means further comprises selection means for selecting certain of said random numbers to be applied to said first control means.

23. An interference avoidance device as defined in claim 21, wherein said source of random numbers is a white noise generator.

24. An interference avoidance device as defined in claim 21, wherein said source of random numbers is a stored number table.

25. An interference avoidance device as defined in claim 21, wherein said source of random numbers is a calculating device programmed according to a predetermined algorithm.

26. An interference avoidance device as defined in claim 21, wherein said timing means further comprises selection means for selecting only numbers which have a separation of $\Delta$ therebetween where $\Delta$ is equal to a value between the minimum amount of time required for a burst of ultrasonic energy to travel from said transmitter to the most remote object to be detected and return to said receiver and the maximum time that the system can wait before reacting.

27. An interference avoidance device as defined in claim 1, further comprising counter means coupled to said generator means for counting the number of predetermined patterns of signals produced by said generator means.

28. An interference avoidance device as defined in claim 27, further comprising second display means coupled to said counter means to display the distance from said transmitter means to said object within the zone monitored by said sensor system.

* * * * *